Patented May 1, 1934

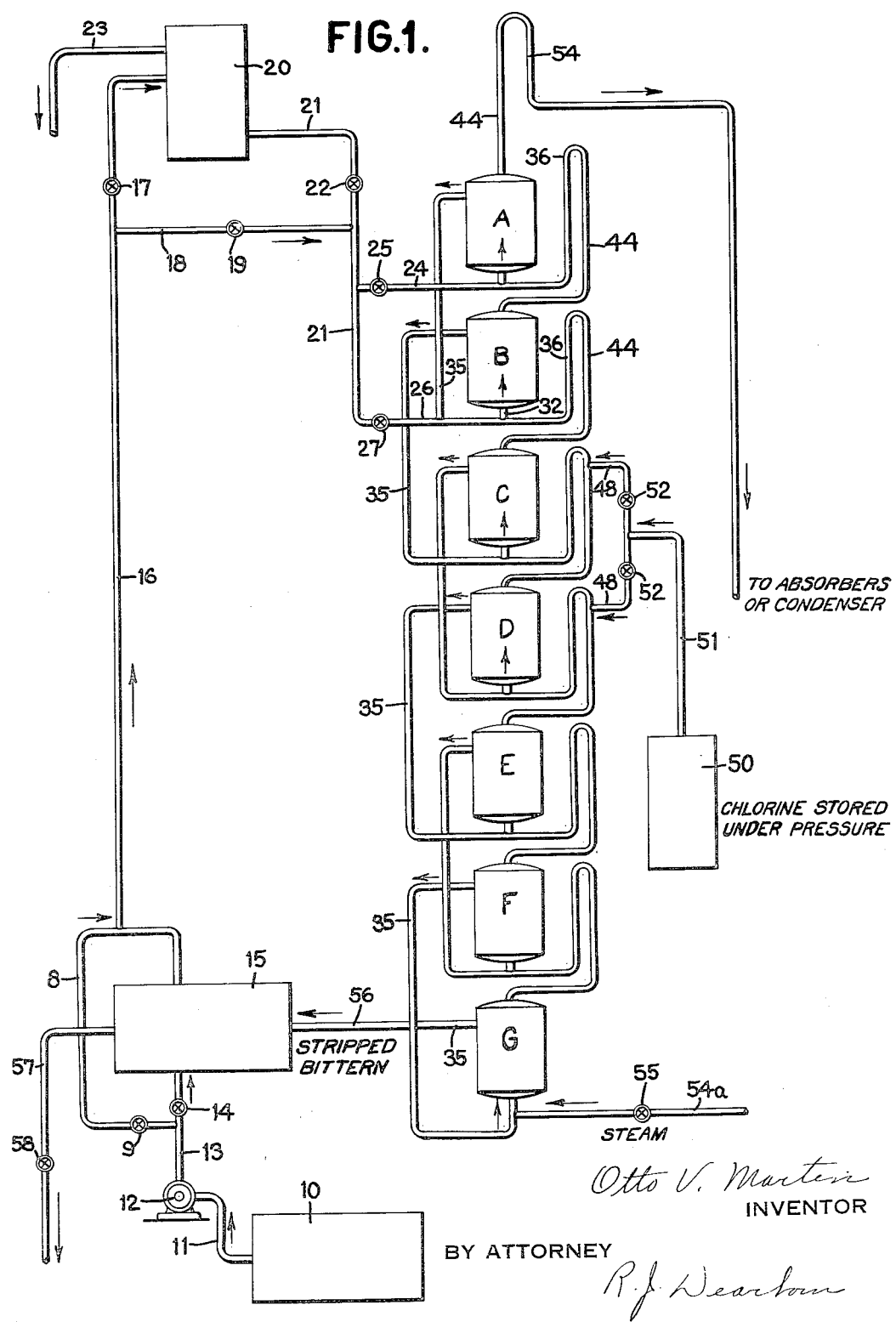

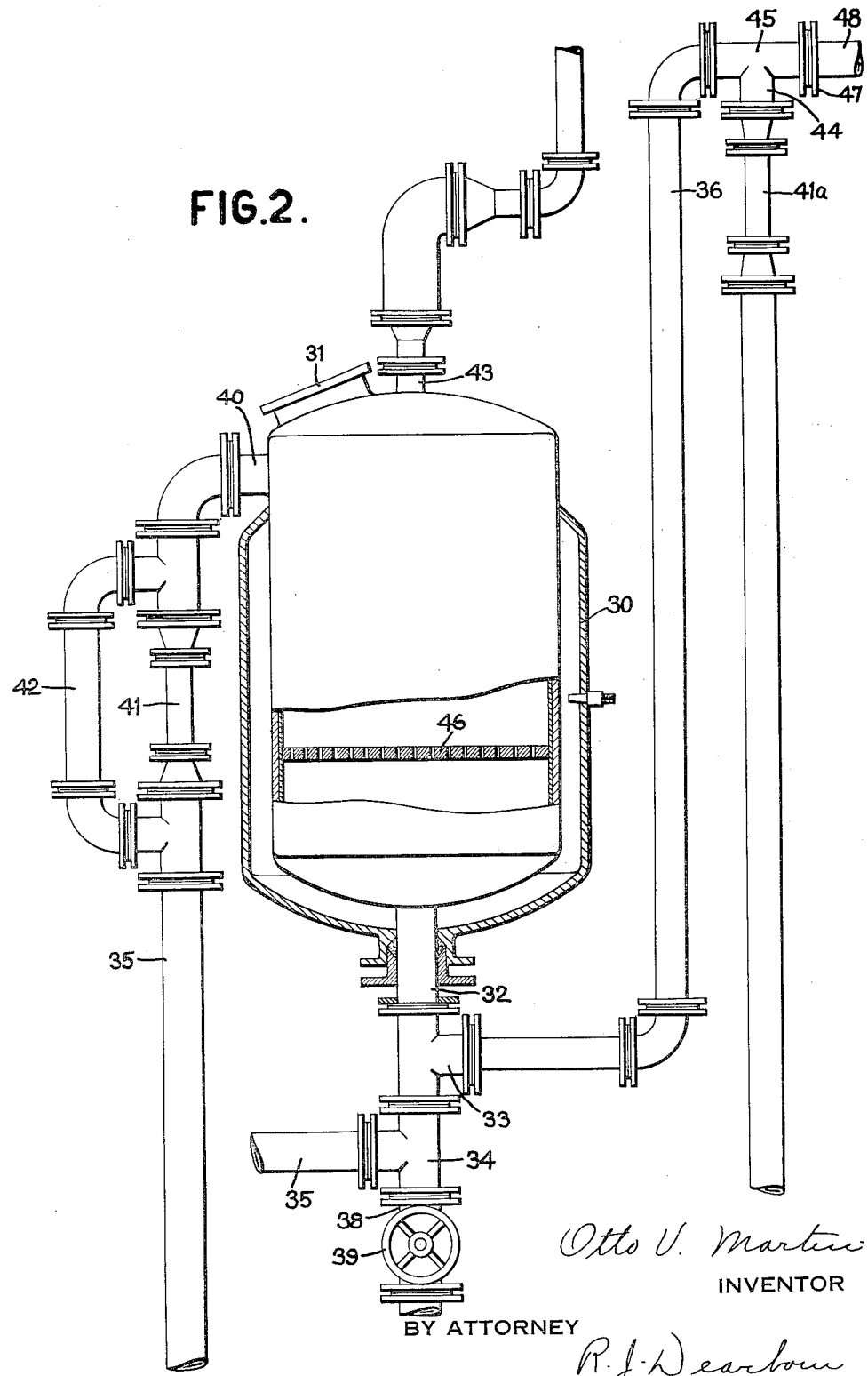

1,956,993

UNITED STATES PATENT OFFICE 1,956,993

METHOD OF AND APPARATUS FOR RECOVERING HALOGENS FROM BRINES

Otto V. Martin, Sand Springs, Okla., assignor to Texaco Salt Products Company, New York, N. Y., a corporation of Delaware Application August 19, 1930, Serial No. 476,404

14 Claims. (Cl. 23—218)

This invention relates to a method of recovering halogens from halogen containing liquors such as salt solutions, brines and the like, and an improved type of apparatus therefor.

The invention broadly contemplates the recovery of halogens, particularly bromine and iodine, from salt solutions or naturally occurring brines in which the bromine or iodine may be present in the form of bromides or iodides, by a process which comprises reacting the heated brine with a material adapted to chemically replace bromine or iodine and liberate them from their compounds in the solution while subjecting the brine to heating at elevated temperatures under super-atmospheric pressures.

The invention further contemplates apparatus which is particularly well adapted to effecting reactions between salt solutions and chemical reagents for the recovery of desired products from the solutions.

Bromine and iodine usually occur in appreciable amounts in the water from mineral springs or in brines as frequently obtained from wells in petroleum producing fields, and in which brines these elements may be present largely as bromides or iodides of sodium, potassium, or magnesium and to the extent of usually not over a tenth of a per cent by weight of the brine and on account of which low yield it is desirable when treating brines for their bromine or iodine content to obtain as nearly substantially complete recovery as possible.

The usual method of recovering bromine from brine wherein the brine is treated with chlorine to liberate the bromine from its salts in the brine solution may comprise introducing the brine in a heated state to the upper portion of a packed column wherein it flows downwardly through the tower counter-currently to a rising stream of vaporous material consisting of chlorine, which is being admitted at a lower point in the column, and bromine and other vaporous materials being liberated from the solution, whereby the brine is brought into contact with the chlorine as it bubbles upwardly through the descending liquid. The liberated bromine vapor rises to the top of the tower to be conducted to a condenser or other suitable collecting means while the stripped brine is withdrawn from the bottom of the tower.

As is generally known, a heavier or higher molecular weight member of the halogen series may be substituted or replaced in its chemical compounds by a lower molecular weight member of the series. Thus the chlorine which is introduced to the column reacts with the bromine compounds liberating the bromine as free bromine by substituting itself in the chemical compound with which the bromine was previously associated. The liberated bromine rising to the top of the column may be drawn off to a condenser or other collecting means, while the effluent treated brine may be subjected to stripping with steam, preferably in the lower portion of the column in order to strip out any excess chlorine which might otherwise remain dissolved therein and thus be wasted.

Heretofore it has been impossible to completely remove the bromine present in brines by the usual methods followed such as that just described and in many cases only about sixty to seventy per cent of that available has been obtained due both to incomplete contact attained between the reagent and the brine as well as to the relatively low temperatures and pressures employed in carrying out the reaction.

I have found, however, that by bubbling the chlorine or other substitution agent through bodies or pools of the brine in a plurality of successively connected vessels wherein it may be maintained in a heated or a boiling condition at super-atmospheric pressures and therefore at correspondingly elevated temperatures, the reaction between the chlorine and the bromine or iodine compounds contained in the solution is greatly facilitated. By maintaining pressure on the vessels a relatively large quantity of chlorine gas may be maintained within the system so that the reaction in any one vessel may be carried out in the presence of an excess of the reagent. The presence of a large amount of chlorine in excess of that required to react with the brine flowing through any given portion of the treating system assures that the total available bromine present will be continuously removed from the brine particularly where, due to slight fluctuations in the introduction of chlorine to the system there might otherwise be at times an insufficiency resulting in under treatment of the brine and consequent incomplete recovery of the desired products.

My invention therefore contemplates a continuous method of treating halogen containing brine with chlorine or other suitable reagent to recover the halogens, which comprises flowing the brine successively through a series of vessels in which relatively large bodies of brine are subjected to heating, preferably so as to boil the liquid in the intermediate and last vessels of the series under progressively increasing pressures and at correspondingly increasing temperatures; introducing chlorine to the series of vessels to bubble through the bodies of heated liquid while flowing through the series towards the point of introduction of the charge wherein it reacts with the halogen containing salts in the solution to liberate the desired halogens as vapor which is passed through the vessels in succession to accumulate in the first vessel of the series from which it is withdrawn for further treatment, while the treated brine, stripped of the desired halogens and free chlorine, is withdrawn from the last vessel of the series.

In the practice of my invention for the recovery of bromine and iodine from oil field brines, the brine which may first be treated in order to remove impurities, or certain salts, such as sodium chloride, is flowed through a series of super-imposed vessels wherein the brine is reacted with chlorine while maintained in a boiling condition at elevated temperatures.

The vessels are so disposed that the brine, preferably after preheating to approximately its normal boiling temperature, is introduced to the bottom of the top vessel and from the upper portion of which it overflows to the next vessel below, and so on through the remaining vessels such that a relatively large body of brine is maintained in each vessel. The treated brine collecting in the bottom or last vessel of the series may be withdrawn therefrom to storage or for disposition in any suitable manner. The chlorine, on the other hand, may be introduced, preferably to one or more intermediate vessels in the series in which it bubbles through the liquid within the vessels wherein it reacts with the bromine and iodine salts contained therein to liberate bromine or iodine or both in vaporous form. The unreacted or free chlorine and liberated vaporous materials leaving each vessel are conducted to the bottom of the next vessel containing brine richer in the desired products, through which they are bubbled and wherein more of the chlorine reacts with the salts dissolved in the brine liberating still more bromine or iodine which together with the remaining chlorine pass out of this vessel into the bottom of the next vessel, and so on throughout the remaining vessels of the series. Thus, the quantity of chlorine entering an upper vessel, from a lower one, progressively decreases and finally diminishes entirely, while the quantity of liberated bromine and iodine gradually increases and eventually accumulates in the top vessel of the series from which it may be finally drawn off to suitable condensing or absorbing means.

The vapor evolved in a lower or preceding vessel must overcome a static pressure equivalent to the pressure exerted by the head of liquid maintained in the upper or succeeding vessel through which it must rise in passing upward through the series of vessels. The depth of liquid maintained in these vessels is preferably such that the static pressure exerted in the lower vessel of the series may be of the order of 30 to 50 pounds per square inch gauge, progressively decreasing in succeeding upper vessels. In order to effect boiling of the brine under these pressures the temperatures maintained may range from 265° F. to as high as 300° F. At these elevated temperatures the reaction between the bromine or iodine containing salts and the chlorine reagent takes place very rapidly and completely, thereby facilitating substantially complete liberation of the bromine or iodine in the brine. Moreover, under these elevated pressures substantial quantities of the chlorine may be dissolved in the relatively large bodies of brine maintained in the intermediate vessels of the series whereby the reaction in any one of these vessels is carried on in the presence of a substantial excess of the chlorine.

In order to more clearly understand the novel features of my invention reference will now be made to the figures of the accompanying drawings illustrating a preferred form of apparatus adapted to the practice of my invention and in which:

Figure 1 is a diagrammatic view illustrating a treating system adapted to carrying out the invention.

Figure 2 is a partial sectional view in elevation of one of the reacting vessels shown in Figure 1.

Referring to Figures 1 and 2 brine to be treated may be drawn from a storage tank 10 through a pipe 11 by a suitable pump 12 by which it is delivered through a pipe 13, having a valve 14, to a heat interchanger 15 wherein heat may be recovered from a stream of hot treated brine being withdrawn from the system. A bypass 8 having a valve 9 is provided to permit bypassing all or part of the brine around the heater 15 as may be desired.

Preheated brine may be conducted from the heat interchanger 15 by a pipe 16, having a valve 17 to an elevated storage tank 20 from which it may flow through a line 21, having a valve 22, to the vessel A, any excess liquid collecting in the tank 20 overflowing through a line 23 to be returned either to the storage tank 10 or to other suitable receiving means.

The tank 20 may also be by-passed, in which case the brine is delivered through a branch pipe 18, having a valve 19, to the pipe 21 previously mentioned.

From the supply pipe 21 the brine solution may be introduced through one or more branch pipes 24 and 26, having valves 25 and 27, respectively, to one or more of the series of reacting vessels A, B, C, etc. as may be desired. A substantial pool of brine is maintained in each vessel of the series, wherein a suitable treating reagent, preferably introduced in vaporous form to a lower vessel of the series, is bubbled through the brine in succeeding vessels as will be presently described in more detail, while the excess brine collecting in each vessel overflows therefrom to the next lower and so on to be eventually withdrawn from the system through the heat exchanger 15 wherein it gives up its heat to the fresh incoming charge.

The reacting vessels, A, B, C, etc., as shown in Figure 2, are preferably provided with a jacket 30 into which steam or other heating media may be admitted to supply heat to the contents of the vessel as may be desired. A manway 31 is provided at the top of the vessels through which access may be had to their interior for purposes of inspection and cleaning.

Each of the vessels A, B, C, etc. as well as all of the liquid and vapor conduits communicating therebetween may be formed from iron or steel, preferably lined with a glass enamel which is resistant to the chemical action of chlorine and bromine. A porous plate 46 is preferably secured within the lower portion of each vessel in order to effect intimate contact between the vapors or gaseous materials entering the bottom of the vessel and the liquid maintained therein.

A port 32 at the bottom of each vessel, communicating with T fittings 33 and 34 provides an inlet to the vessel through which liquid from a succeeding vessel may be introduced from an overflow pipe 35 leading from a succeeding vessel, and vapor from a preceding vessel may be introduced through a pipe 36 leading from a preceding vessel.

The lower and otherwise open end of the T 34 may be closed with a blind flange having a port provided therein to accommodate either a nipple 38, having a valve 39, through which samples of liquid flowing from the succeeding vessel may be withdrawn or a glass vent pipe whose upper and open end may extend vertically a sufficient distance to prevent liquid overflowing therefrom and which may serve as a manometer to indicate pressures prevailing within the vessels.

Liquid overflows from each vessel through a port 40 provided near the top of the vessel, into the pipe 35 through which it is conducted to the bottom of a preceding vessel immediately below, as previously mentioned.

A sight glass 41 may be provided, preferably near the top of the rising portion of the pipe 35, having an auxiliary passage 42 around it to accommodate that portion of the liquid not flowing through the glass which, due to limitations in the bursting strength of relatively large glass tubes of this nature, may of necessity be of relatively smaller internal diameter than the pipe 35.

A vapor outlet port 43 at the top of the vessel affords an outlet through which vapors escape from the vessel into a pipe 44, having a sight glass 41a, rising to a suitable height, preferably above that of a succeeding vessel, and communicating through a T 45 with a downwardly extending pipe 36 already mentioned and through which vapors from the preceding vessel are introduced to the vessel immediately above.

The relatively long vapor conduit forming an inverted U serves both to maintain the proper depth of liquid in each vessel as well as afford sufficient seal or head to prevent suction of liquid from any vessel through this line into a lower vessel as a result of a partial vacuum being created in the lower vessel as, for example, when cooling and condensation of vapors occurs in the lower vessels.

The vapor outlet pipe 44 leading from the top vessel A similarly communicates with and forms an inverted U with a vapor discharge pipe 54 through which the final vapors leaving the system may be conducted to condensers or absorbers not shown in the drawings and which may be adapted to selectively condense or absorb the bromine and iodine so that they may be collected as separate products.

The T 45 connecting vapor pipes 36 and 44 is provided with a blind flange 47 having a hole drilled therethrough to accommodate a pipe 48 through which chlorine or other treating reagent may be introduced to the system. Thus chlorine may be conducted from an outside source 50 through a pipe 51 to any desired vessel (see Fig. 1) through the branch pipes 48 having valves 52.

Steam may be admitted through a pipe 54a, having a valve 55, to the lowermost vessel G while the stripped brine free from bromine or iodine overflowing from this vessel may be delivered by the pipe 35 to a pipe 56 through which it is conducted to the heat exchanger 15. From thence the brine which has given up its heat to the fresh incoming charge is drawn off through a pipe 57 having a valve 58 to storage or disposition in any other desired manner.

The two lowermost vessels, preferably serve only as stripping vessels, into the first of which steam may be introduced in order to strip out any free bromine or excess chlorine which might otherwise be withdrawn from the system in the treated brine.

It will be seen that by employing a system of this nature a substantial body of brine is at all times maintained in each vessel or reservoir through which the chlorine containing vapors passing off from a similar body of liquid in a lower and preceding vessel are caused to bubble. Thus continual contact between vaporous chlorine and brine is assured regardless of slight unintentional interruptions or variations in the rate of introduction of fresh brine to the system and the possibility of channelling or short-circuiting of rising vapor and down flowing liquid, as may be frequently experienced in the conventional type of packed column particularly when operating under conditions of minimum charge rate, is completely precluded in my system regardless of variations in the charging rate.

An important feature of my process comprises reacting the chlorine or other substitution medium with the brine under super-atmospheric pressures and at correspondingly elevated boiling temperatures for the purpose of facilitating the reaction rate and thereby effecting complete recovery of the desired products.

In the above described apparatus the pressure in the uppermost vessel may be substantially atmospheric, depending upon that which may be created in the form of a back pressure from the condensing or absorption system, while the pressure existing in the lowermost vessel on the other hand will be substantially above that existing in the upper vessel. Thus it may range as high as forty pounds per square inch gauge or even higher, which may raise the boiling temperature of the brine from about 265° F. to upwards of 300 or 325° F., which increase in temperature effects a very considerable increase in the rate of its reaction.

A progressive decrease in pressure towards the upper portion of the system permits the bromine liberated from chemical combination within the solution in the lower and hotter portion of the system to more readily volatilize and escape as vapor from the uppermost vessel A.

The static pressure exerted in the lower vessels is equivalent to that exerted by a head of liquid comprising the sum of the liquid heads in each of the higher vessels of the series. Therefore the pressure exerted on the lower vessels is dependent upon the number of vessels which are employed as well as the back pressures created on the system by the absorbing or condensing means. It is contemplated therefore that pressures as high as 70 to 100 pounds may be exerted on the lower reacting vessels if desired by increasing the number of vessels in the series or by creating a back pressure on the vapor exit line.

As already mentioned each vessel is preferably provided with a steam jacket into which steam or other heating media may be introduced in order to apply the necessary amount of heat to the liquid contents of each vessel to effect boiling of the liquid and in which case water is vaporized to form steam which assists in stripping out bromine liberated from its salts and tending to remain dissolved in the liquid.

An important advantage gained by the employment of the apparatus of my invention over the packed columns generally employed is that the intermediate vessels of my brine treating system are adapted to maintain in reserve a quantity of chlorine or other treating agent, more electronegative than the halogens to be displaced, substantially in excess of that immediately required to react with and completely liberate the bromine or iodine available in the pool of brine maintained in any one vessel in the intermediate portion of the series. That is, the super-atmospheric pressure maintained within the vessels serves to hold substantial proportions of free chlorine in solution within the brine liquid thereby facilitating complete and positive contact between the chlorine and the brine, which is of considerable advantage in obtaining complete reaction and complete recovery of the total available bromine or iodine.

During normal operation the chlorine is maintained as much as possible entirely within the intermediate vessels so that the uppermost and lowermost vessels in the series are at all times substantially free from chlorine, while an excess of it is held in reserve or in storage within the intermediate reacting vessels immediately above and including those to which it may be initially introduced and wherein the reaction is substantially entirely completed.

Moreover, it will be further seen that, the employment of a plurality of vessels through which the brine is caused to flow in succession while in contact with a relatively large proportion of chlorine, permits maintaining favorable reacting conditions over a considerable period of time.

The quantity of chlorine building up in the system may be observed by inspection of the material flowing through the sight glass in the vapor lines. The presence of chlorine in bromine vapors causes a distinct fading out of the color of the otherwise dark reddish brown bromine fumes. Ordinarily the introduction of chlorine to the system is adjusted so that the vapors or gases entering the top chamber of the series will be free from any chlorine whatsoever.

On the other hand, an insufficiency of chlorine within the system may be readily detected upon withdrawing samples of brine solution from any of the reacting vessels, below the point at which chlorine may be introduced to the system, through the sample pipes 38 and testing such samples for the presence of bromine or iodine by rapid and generally known chemical qualitative methods.

It will be noted that bromine or iodine is stripped from the halogen-containing brine, in accordance with the present invention, without preliminary acidification, which has heretofore been considered advantageous for the most efficient recovery of the bromine or iodine. In the present case no preliminary acidification is effected, notwithstanding that the brine of the type referred to above is decidedly alkaline, that is, has a pH value of from 7 to 12. This feature constitutes one of the distinct advantages of the invention claimed in the present application.

Obviously many modifications and variations of the invention, as hereinbefore set forth, may be made without departing from the spirit and scope thereof, and therefore only such limitations should be imposed as are indicated in the appended claims.

I claim:

1. The continuous method of recovering halogens from halogen containing salts in solution which comprises flowing the solution through a series of reaction chambers containing relatively large bodies of the solution wherein the liquid in successive chambers is heated under progressively increasing pressure, bubbling a displacement reagent through the heated bodies of liquid in intermediate chambers of the series wherein it reacts with the halogen containing salts in the brine to liberate the desired halogens in vapor form, passing the liberated halogen vapors through the chambers to collect in the first chamber of the series, removing the vapors therefrom and withdrawing the treated brine, substantially free from the desired halogens from the last chamber of the series.

2. The continuous method of recovering bromine from brine which comprises flowing the brine through a series of brine pools containing quantities of the brine, bubbling chlorine through the liquid in intermediate pools of the series wherein it reacts with the halogen containing salts in the brine to liberate the bromine in vapor form, introducing steam into one of the last of said series of pools for stripping vapors therefrom, passing the liberated bromine vapors to the space above one of the first pools of the series, removing the vapors therefrom and withdrawing the brine substantially free from bromine from the last vessel of the series.

3. The continuous method of recovering bromine from brine wherein the brine is treated with chlorine to liberate the desired halogens, which comprises flowing the brine through a series of pools containing substantial quantities of the brine, wherein the liquid in successive pools is heated under progressively increasing pressure and temperature, bubbling the chlorine through the heated bodies of liquid in intermediate pools of the series wherein it reacts with the halogen containing salts in the brine to liberate the bromine in vapor form, passing the liberated bromine vapors through the pools to collect above the first pool of the series, removing the vapors therefrom, introducing steam to one of the last pools of the series to strip out free halogens tending to remain dissolved in the treated brine collecting therein and withdrawing the stripped brine therefrom.

4. The continuous method of recovering halogens from halogen containing brine which comprises introducing the solution to the first of a series of heated pools of brine of successively lower elevation, overflowing the solution from the first pool to the next and repeating the operation until the last pool is reached, introducing a displacement reagent to one of the lower of the series of pools and causing the reagent to bubble through the several bodies of liquid while flowing through the series towards said first pool and wherein it reacts with the salts in the solution to liberate the halogens in vaporous form, removing the halogen vapors from above the first pool and withdrawing the solution, substantially free from the desired halogen products, from the last pool of the series.

5. The continuous method of recovering halogens from halogen containing brine which comprises introducing the solution to the first of a series of pools of brine, overflowing the solution from the first pool to the next and repeating the operation until the last pool is reached, heating the intermediate and last pools of the series to the boiling point, introducing a displacement reagent to the brine in one of said pools and causing said reagent to bubble through the several bodies of liquid while flowing towards said first pool and wherein it reacts with the salts in the brine to liberate the desired halogens in vaporous form, passing the halogen vapors successively through the pools of brine to accumulate above the first pool, removing the halogen vapors therefrom and withdrawing the stripped brine from the last of the series of pools.

6. Apparatus for continuously treating brine with a reagent to liberate halogens therefrom in vapor form, comprising a series of vessels, means for introducing fresh brine to one of the first of said series of vessels, liquid communicating means between the vessels through which the brine flows from a preceding vessel to a succeeding vessel while maintaining substantial bodies of solution in each vessel, means for introducing said reagent into an intermediate one of the series of vessels, means for conducting vapors from a succeeding vessel to a preceding vessel beneath the surface of the liquid in said preceding vessel, a vapor outlet from the first vessel of the series through which the vapors accumulating therein are withdrawn for further treatment, means for introducing steam to the last vessel of the series to strip out free halogen tending to remain dissolved in the brine collecting therein, and a liquid outlet through which the stripped brine is withdrawn.

7. Apparatus for continuously treating brine with a reagent comprising a series of vessels arranged at successively lower elevations, means for introducing fresh brine to one of the first of the series of vessels, liquid communicating means between the vessels through which the brine flows from a preceding vessel to a succeeding vessel while maintaining substantial bodies of solution in each vessel, means for introducing a displacement reagent into one of the lower of the series of vessels, trapped means for conducting vapors upwardly from a succeeding vessel to a preceding vessel while preventing the downward passage of liquid therethrough, a vapor outlet from the first vessel of the series through which the vapors accumulating therein are withdrawn and means for introducing steam to one of the last vessels of the series to strip out free halogen tending to remain dissolved in the brine collecting therein.

8. The method of removing halogens from halogen containing brine comprising passing the brine through a series of pools of brine maintained under successively increasing pressures, and passing a displacement reagent through said pools countercurrently with respect to the flow of brine.

9. The method of removing halogens from halogen containing brine comprising passing the brine through a series of pools of brine maintained under successively increasing pressures, introducing a gaseous displacement reagent into an intermediate pool of said series and stripping free halogens from the brine in pools of greatest pressure.

10. Apparatus for continuously treating brine with a displacement reagent to liberate halogens therefrom in vapor form, comprising a series of vessels arranged at successively lower elevations, means for introducing fresh brine to one of the first of the series of vessels, liquid communicating means between the vessels through which the brine flows from a preceding vessel to a succeeding vessel while maintaining substantial bodies of solution in each vessel, means for introducing a displacement reagent into one of the lower of the series of vessels, means for conducting vapors, including said reagent from a succeeding vessel to a point beneath the normal liquid surface of a preceding vessel, said last-named means being formed with a vapor trap for preventing the downward flow of vapors therethrough and a vapor outlet from one of the first vessels of the series through which the displaced halogens accumulating therein are withdrawn.

11. An apparatus for recovering halogens from halogen containing brine comprising a series of superimposed vessels formed with overflow means extending from a point above the bottom of each vessel to the next succeeding lower vessel and with vapor conducting means extending from the upper portion of each vessel to the lower portion of the next succeeding higher vessel, means for introducing a displacement reagent into an intermediate vessel of said series and means for removing vapor and brine from upper and lower members of said series respectively.

12. An apparatus for continuously removing halogens from halogen containing brine comprising a series of reaction vessels provided with perforated baffles therein, means for introducing said brine into one of the first of said vessels and means for introducing a displacement reagent into a vessel further along said series, overflow means for conducting brine from the space above the baffle in each vessel to a next succeeding vessel beyond said first vessel and vapor conducting means leading from the space above the baffle of each vessel to the space beneath the baffle of the next succeeding vessel for conducting vapors toward said first vessel.

13. The method of recovering halogens from halogen containing salts in solution which comprises flowing the brine progressively through a reaction tower while maintaining a substantial quantity of brine throughout said tower, introducing a displacement reagent into an intermediate section of said tower, conducting the displaced halogen progressively upwardly through said tower, withdrawing the displaced halogens from the upper section of said tower and withdrawing the treated brine from the lower section thereof.

14. The method of recovering halogens from halogen containing salts in solution which comprises flowing the brine progressively through a reaction tower from which air is excluded while maintaining a substantial quantity of brine throughout said tower, introducing a displacement reagent into an intermediate section of said tower, introducing steam into a lower section of said tower, conducting the displaced halogen progressively upwardly through said tower, withdrawing the displaced halogens from the upper section of said tower and withdrawing the treated brine from the lower section thereof.

OTTO V. MARTIN.